US009894386B2

(12) United States Patent
Lee

(10) Patent No.: US 9,894,386 B2
(45) Date of Patent: Feb. 13, 2018

(54) TRANSFORM METHOD BASED ON BLOCK INFORMATION, AND APPARATUS USING SAID METHOD

(71) Applicant: GOLDPEAK INNOVATIONS INC, Seoul (KR)

(72) Inventor: Sun Young Lee, Seoul (KR)

(73) Assignee: GOLDPEAK INNOVATIONS INC., Seoul (KR)

( * ) Notice: Subject to any disclaimer, the term of this patent is extended or adjusted under 35 U.S.C. 154(b) by 666 days.

(21) Appl. No.: 14/394,248

(22) PCT Filed: Apr. 11, 2013

(86) PCT No.: PCT/KR2013/003048
§ 371 (c)(1),
(2) Date: Oct. 13, 2014

(87) PCT Pub. No.: WO2013/154366
PCT Pub. Date: Oct. 17, 2013

(65) Prior Publication Data
US 2015/0124876 A1    May 7, 2015

(30) Foreign Application Priority Data

Apr. 12, 2012 (KR) .................. 10-2012-0038088

(51) Int. Cl.
*H04N 19/61* (2014.01)
*H04N 19/593* (2014.01)
(Continued)

(52) U.S. Cl.
CPC ............ *H04N 19/61* (2014.11); *H04N 19/12* (2014.11); *H04N 19/157* (2014.11);
(Continued)

(58) Field of Classification Search
CPC .... H04N 19/12; H04N 19/157; H04N 19/176; H04N 19/44; H04N 19/593; H04N 19/61
See application file for complete search history.

(56) References Cited

U.S. PATENT DOCUMENTS 5,144,426 A * 9/1992 Tanaka ................. H04N 19/159
375/240.13
6,134,269 A * 10/2000 Puri ......................... G06T 9/008
375/240.03
(Continued)

FOREIGN PATENT DOCUMENTS

KR   10-2006-0053910   5/2006
KR   10-2007-0037533   4/2007
(Continued)

OTHER PUBLICATIONS

International Search Report dated Jun. 24, 2013 in International application No. PCT/KR2013/003048.

*Primary Examiner* — Peter D Le
(74) *Attorney, Agent, or Firm* — Lex IP Meister, PLLC

(57) ABSTRACT

Disclosed are a transform method based on block information and an apparatus using the method. An image-decoding method comprises: a step of taking information on a block as an input; and a transform method determination step of determining an inverse transform method for the block on the basis of whether or not the prediction mode of the block is an intra-prediction mode, whether or not the size of the block satisfies a predetermined condition, and whether or not the block is a block for a luminance sample. Accordingly, encoding efficiency can be improved by using an appropriate transform method on the basis of the information on a prediction block and an intra-prediction mode.

11 Claims, 10 Drawing Sheets

(51) Int. Cl.
*H04N 19/176* (2014.01)
*H04N 19/12* (2014.01)
*H04N 19/157* (2014.01)
*H04N 19/44* (2014.01)

(52) U.S. Cl.
CPC ........... *H04N 19/176* (2014.11); *H04N 19/44* (2014.11); *H04N 19/593* (2014.11)

(56) References Cited

U.S. PATENT DOCUMENTS

| | | | | |
|---|---|---|---|---|
| 6,157,676 | A * | 12/2000 | Takaoka | H04N 19/593 348/409.1 |
| 6,611,560 | B1 * | 8/2003 | Kresch | H04N 5/145 348/E5.066 |
| 6,658,157 | B1 * | 12/2003 | Satoh | G06F 17/147 375/E7.143 |
| 2005/0058204 | A1 * | 3/2005 | Fernandes | H04N 19/40 375/240.16 |
| 2005/0157797 | A1 * | 7/2005 | Gaedke | H04N 19/105 375/240.24 |
| 2005/0249291 | A1 * | 11/2005 | Gordon | H04N 19/159 375/240.18 |
| 2006/0018559 | A1 | 1/2006 | Kim et al. | |
| 2007/0160133 | A1 * | 7/2007 | Bao | H04N 19/105 375/240.1 |
| 2008/0025397 | A1 * | 1/2008 | Zhao | H04N 19/172 375/240.13 |
| 2008/0089597 | A1 * | 4/2008 | Guo | H04N 19/30 382/238 |
| 2008/0165848 | A1 * | 7/2008 | Ye | H04N 19/105 375/240.13 |
| 2009/0238271 | A1 * | 9/2009 | Kim | H04N 19/176 375/240.12 |
| 2010/0166327 | A1 * | 7/2010 | Goel | H04N 19/105 382/236 |
| 2011/0200113 | A1 | 8/2011 | Kim et al. | |
| 2011/0286516 | A1 * | 11/2011 | Lim | H04N 7/17318 375/240.03 |
| 2012/0057630 | A1 * | 3/2012 | Saxena | H04N 19/105 375/240.03 |
| 2012/0236931 | A1 * | 9/2012 | Karczewicz | H04N 19/132 375/240.02 |
| 2013/0003859 | A1 * | 1/2013 | Karczewicz | H04N 19/70 375/240.24 |
| 2013/0022118 | A1 | 1/2013 | Kim et al. | |
| 2013/0129241 | A1 * | 5/2013 | Wang | G06T 9/004 382/233 |

FOREIGN PATENT DOCUMENTS

| | | |
|---|---|---|
| KR | 10-2008-0026463 | 3/2008 |
| KR | 10-2010-0042542 | 4/2010 |
| KR | 10-2011-0033511 | 3/2011 |

* cited by examiner

TRANSFORM METHOD BASED ON BLOCK INFORMATION, AND APPARATUS USING SAID METHOD

CROSS-REFERENCE TO RELATED APPLICATIONS

This application is the National Stage of International Application No. PCT/KR2013/003048, filed on Apr. 11, 2013, and claims priority from and the benefit of Korean Patent Application No. 10-2012-0038088, filed on Apr. 12, 2012, which are hereby incorporated by reference for all purposes as if fully set forth herein.

BACKGROUND

Field

The present invention relates to a video coding and decoding method and, more particularly, to transform methods.

Discussion of the Background

Recently, a demand for video having high resolution and high quality, such as High Definition (HD) video and Ultra High Definition (UHD) video, is increasing in various application fields. As video data becomes high resolution and high quality, the amount of data is relatively more increased than existing video data. If video data is transmitted using a medium, such as an existing wired/wireless broadband line, or stored using an existing storage medium, transmission costs and storage costs are increased. In order to solve such problems attributable to high-resolution and high-quality video data, high-efficiency video compression techniques may be used.

The video compression techniques may include various techniques, such as an inter prediction technique for predicting a pixel value included in a current picture from a picture anterior to or posterior to the current picture, an intra prediction technique for predicting a pixel value included in a current picture using about pixel information within the current picture, and an entropy coding technique for assigning a short symbol to a value having a high frequency of appearance and a long symbol to a value having a low frequency of appearance. Video data can be effectively compressed, transmitted, or stored using such video compression techniques.

SUMMARY

An object of the present invention is to provide transform methods based on prediction block information for improving video coding efficiency.

Another object of the present invention is to provide an apparatus for performing transform methods based on prediction block information for improving video coding efficiency.

A video decoding method in accordance with an aspect of the present invention may include determining information about a prediction block and determining a transform method of determining whether the prediction block is a block using an intra prediction mode in order to determine a vertical inverse transform method and a horizontal inverse transform method for the prediction block, whether a value obtained by multiplying the width and height of the prediction block satisfies a specific condition, and whether the prediction block is a block for a luma sample. The video decoding method may further include determining an inverse transform method of the prediction block on which intra prediction has been performed using an intra prediction mode other than a DC mode to be inverse Discrete Sine Transform (inverse DST), if the prediction block is the block using the intra prediction mode, the value obtained by multiplying the width and height of the prediction block satisfies the specific condition, and the prediction block is the block for the luma sample. The video decoding method may further include determining the inverse transform method of the prediction block to be inverse Discrete Cosine Transform (inverse DCT), if the prediction block is the block using the intra prediction mode, the value obtained by multiplying the width and height of the prediction block does not satisfy the specific condition, or the prediction block is not the block for the luma sample. The video decoding method may further include determining the inverse transform method of the prediction block to be inverse Discrete Sine Transform (inverse DST), if the prediction block is the block using the intra prediction mode, the value obtained by multiplying the width and height of the prediction block satisfies the specific condition, and the prediction block is the block for the luma sample. The prediction block may be a block generated by filtering the values of a reference pixel and a reference pixel, if the intra prediction mode is a DC mode and the prediction block is computed based on the DC mode. The specific condition may be a condition that the value obtained by multiplying the width and height of the prediction block satisfies 16. The video decoding method may further include determining the horizontal inverse transform method based on information about the intra prediction mode of the prediction block and determining the vertical inverse transform method based on information about the intra prediction mode of the prediction block. Determining the horizontal inverse transform method based on the intra prediction mode may include determining the horizontal inverse transform method to be inverse DCT if the number of the intra prediction mode is 22 or more to 30 or less and determining the horizontal inverse transform method to be inverse DST if the number of the intra prediction mode is not 22 or more to 30 or less. Determining the vertical inverse transform method based on the intra prediction mode may include determining the vertical inverse transform method to be inverse DCT if the number of the intra prediction mode is 6 or more to 14 or less and determining the vertical inverse transform method to be inverse DST if the number of the intra prediction mode is not 6 or more to 14 or less.

A video decoding apparatus in accordance with an aspect of the present invention may include a block information receiving module configured to receive information about a prediction block and an inverse transform method determination module configured to determine whether the prediction block is a block using an intra prediction mode, whether a value obtained by multiplying the width and height of the prediction block satisfies a specific condition, and whether the prediction block is a block for a luma sample based on the information received from the block information receiving module. The inverse transform method determination module may be configured to determine an inverse transform method of the prediction block on which intra prediction has been performed using an intra prediction mode other than a DC mode to be inverse Discrete Sine Transform (inverse DST), if the prediction block is the block using the intra prediction mode, the value obtained by multiplying the width and height of the prediction block satisfies the specific condition, and the prediction block is the block for the luma sample. The inverse transform method determination module may be configured to determine the inverse transform method of the prediction block to be inverse Discrete Cosine Transform (inverse DCT), if the prediction block is the block using the intra prediction mode, the value obtained by multiplying the width and height of the prediction block does not satisfy the specific condition, or the prediction block is not the block for the luma sample. The inverse transform method determination module may be configured to determine the inverse transform method of the prediction block to be inverse Discrete Sine Transform (inverse DST), if the prediction block is the block using the intra prediction mode, the value obtained by multiplying the width and height of the prediction block satisfies the specific condition, and the prediction block is the block for the luma sample. The prediction block may be a block generated by filtering the values of a reference pixel and a reference pixel, if the intra prediction mode is a DC mode and the prediction block is computed based on the DC mode. The specific condition may be a condition that the value obtained by multiplying the width and height of the prediction block satisfies 16. The inverse transform method determination module may be configured to determine the horizontal inverse transform method to be DCT if the number of the intra prediction mode is 22 or more to 30 or less and to determine the horizontal inverse transform method to be DST if the number of the intra prediction mode is not 22 or more to 30 or less. The inverse transform method determination module may be configured to determine the vertical inverse transform method to be inverse DCT if the number of the intra prediction mode is 6 or more to 14 or less and determine the vertical inverse transform method to be inverse DST if the number of the intra prediction mode is not 6 or more to 14 or less.

As described above, in accordance with the transform methods based on block information and the apparatus using the same according to the embodiment of the present invention, an appropriate transform method according to an intra prediction mode can be used based on information about a prediction block. Accordingly, coding efficiency can be improved because an appropriate transform method is used based on information about a prediction block and an intra prediction mode.

DETAILED DESCRIPTION OF THE ILLUSTRATED EMBODIMENTS

Elements disclosed in embodiments and drawings of the present invention are independent elements in order to be indicative of different and characteristic functions of a video coding apparatus. It does not mean that each of the elements is essentially formed of separate hardware or a single software element unit. That is, each of the elements has been illustrated as being arranged as each element, for convenience of description. At least two of the elements may be combined to form a single element, or a single element may be divided into a plurality of elements and the plurality of elements may perform functions. An embodiment in which the elements are combined or an embodiment in which each of the elements is divided is included in the scope of the present invention unless it does not deviate from the essence of the present invention.

Furthermore, some elements disclosed in the present invention may not be essential elements that perform essential functions, but may be optional elements for improving only performance. The present invention may be implemented using only elements essential to implement the essence of the present invention other than elements used to improve only performance, and a structure including only essential elements other than optional elements used to improve only performance are included in the scope of the present invention.

Figure 1:
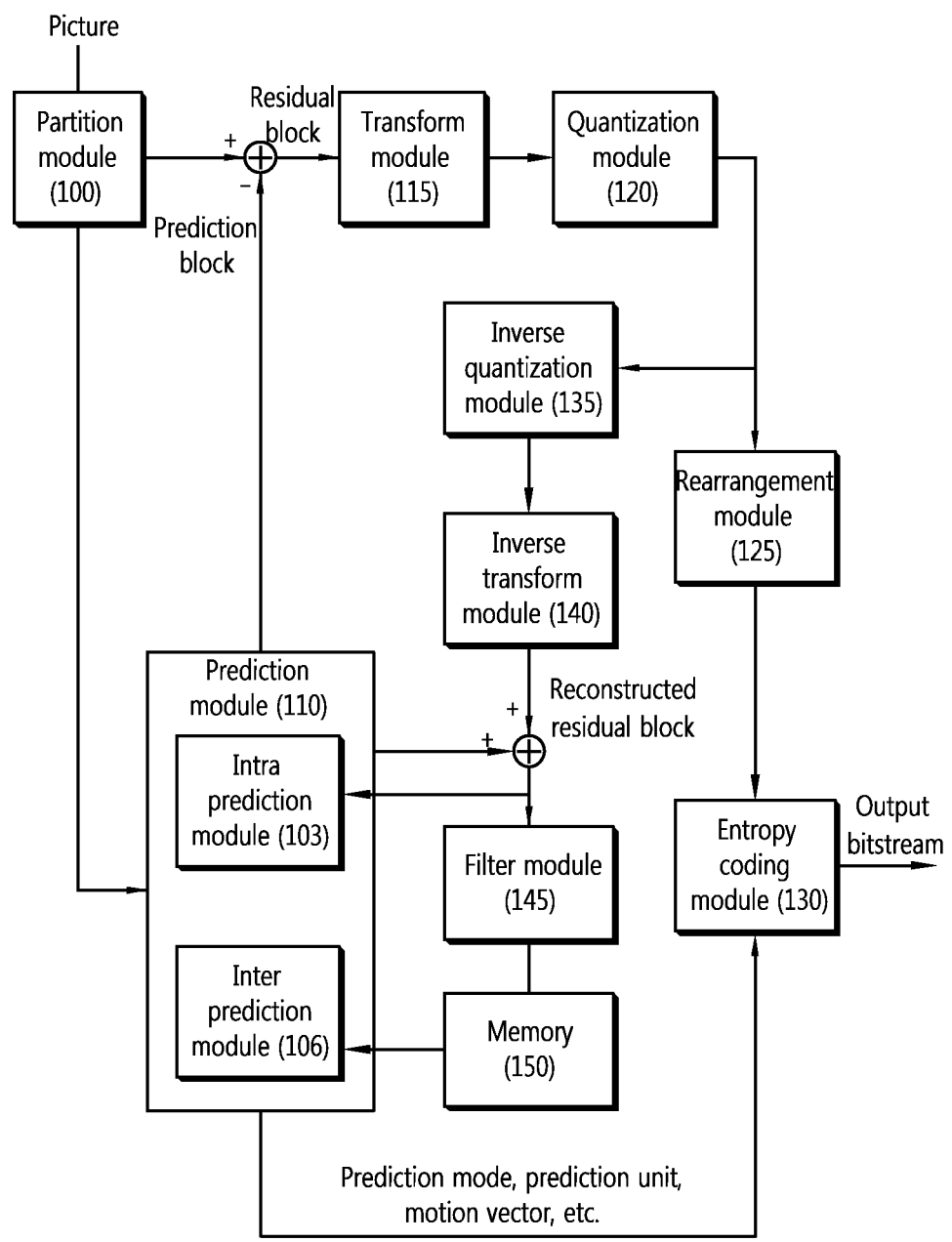
FIG. 1 is a block diagram illustrating a coding apparatus in accordance with an embodiment of the present invention.

FIG. 1 is a block diagram illustrating a coding apparatus in accordance with an embodiment of the present invention.

Referring to FIG. 1, the coding apparatus may include may include a partition module 100, a prediction module 110, an intra prediction module 103, an inter prediction module 106, a transform module 115, a quantization module 120, a rearrangement module 125, an entropy coding module 130, an dequantization module 135, an inverse transform module 140, a filter module 145, and memory 150.

The coding apparatus may be implemented in accordance with a video coding method described below in connection with an embodiment of the present invention, but operations in some elements may not be performed in order to reduce the complexity of the coding apparatus or for fast real-time coding. For example, when the prediction unit performs intra prediction, a method of selecting one of a limited number of intra prediction modes as the final intra prediction mode using some of the limited number of intra prediction modes may be used to perform coding in real time, instead of a method of selecting an optimum intra-frame coding method from all the intra prediction mode methods. For another example, the type of a prediction unit used to perform intra prediction or inter prediction may be limitedly used.

The unit of a block processed by the coding apparatus may be a coding unit on which coding is performed, a prediction unit on which prediction is performed, or a transform unit on which transform is performed. The coding unit may be represented by a term "Coding Unit (CU)", the prediction unit may be represented by a term "Prediction Unit (PU)," and the transform unit may be represented by a term "Transform Unit (TU)."

The partition module 100 may partition a single picture into combinations of a plurality of coding units, prediction units, and transform units, may select one coding unit, prediction unit, and transform unit combination from the combinations as a specific criterion (e.g., a cost function), and may partition a picture using the selected combination. For example, in order to partition a coding unit in a picture, a recurrence tree structure, such as a quadtree structure, may be used. Hereinafter, in embodiments of the present invention, a coding unit may mean a unit on which decoding is performed as well as a unit on which coding is performed.

A prediction unit may be a unit on which intra prediction or inter prediction is performed. A unit on which intra prediction is performed may have a prediction unit of a square form, such as 2N×2N or N×N, or a rectangle form using Short Distance Intra-Prediction (SDIP). A unit on which inter prediction is performed may include a prediction unit partition method using a square unit, such as 2N×2N or N×N, 2N×N or N×2N that is a form in which a prediction unit of a square form is bisected in the same form, or Asymmetric Motion Partitioning (AMP) that is an asymmetrical form. A transform method performed by the transform module 115 may be different depending on the type of prediction unit.

The prediction module 110 may include the intra prediction module 103 configured to perform intra prediction and the inter prediction module 106 configured to perform inter prediction. The prediction module 110 may determine whether or not to use inter prediction in a prediction unit or whether or not to perform intra prediction on a prediction unit. A processing unit and prediction method in which prediction is performed and a processing unit on which detailed contents are determined may be different. For example, in performing intra prediction, a prediction mode may be determined to be a prediction unit, and a process of performing prediction may be performed based on a transform unit. A residual value (or a residual block) between a generated prediction block and the original block may be input to the transform module 115. Furthermore, information about a prediction mode and information about a motion that are used for prediction, together with a residual value, may be coded by the entropy coding module 130 and transferred to a decoder.

If a Pulse Coded Modulation (PCM) coding mode is used, prediction may not be performed by the prediction module 110, but the original block may be coded without change and transmitted to the decoder.

The intra prediction module 103 may generate a prediction unit based on reference pixels around a current prediction block. In order to compute an optimum intra prediction mode for a current prediction block, intra prediction module 103 may generate the current prediction unit based on a plurality of intra prediction modes, and one of the plurality of intra prediction modes may be used. In intra prediction, a prediction mode may include a directional prediction mode in which information about reference pixels is used depending on a prediction direction and a non-directional mode in which directional information is not used when prediction is performed. The type of mode for predicting luma information may be different from the type of mode for predicting chroma information. In order to predict chroma information, an intra prediction mode information about luma information or information about a predicted luma signal may be used.

The intra prediction mode of a current prediction unit may be coded by using a method of deriving the intra prediction mode of the current prediction unit based on information about the intra prediction mode of a surrounding block of the current prediction unit. That is, the intra prediction mode of the current prediction unit may be derived from an intra prediction mode of a prediction unit around the current prediction unit. Assuming that the prediction mode of a current prediction unit is predicted based on information about a mode derived from a surrounding prediction unit, if the intra prediction mode of the current prediction unit is the same as that of the surrounding prediction unit, information indicative that the intra prediction mode of the current prediction unit is the same as that of the surrounding prediction unit may be transmitted using flag information. If the intra prediction mode of the current prediction unit is different from that of the surrounding prediction unit, entropy coding may be performed and information about the prediction mode of a current block may be coded. If a surrounding prediction mode is not available, a predetermined intra prediction mode value may be set as a candidate intra prediction mode value.

The intra prediction module 103 may generate a prediction unit based on information about reference pixels around a current block, that is, information about a pixel within a current picture. If a surrounding block of a current prediction unit is a block on which inter prediction has been performed and thus a reference pixel is a pixel on which inter prediction has been performed, a reference pixel included in the block on which inter prediction has been performed may be replaced with information about the reference pixel of the surrounding block on which intra prediction has been performed. That is, if a reference pixel is not available, information about the unavailable reference pixel may be replaced with at least one of available reference pixels.

If the size of a prediction unit is the same as the size of a transform unit when intra prediction is performed, intra prediction is performed on the prediction unit based on a pixel present on the left of the prediction unit, a pixel present at the left top of the prediction unit, and a pixel present at the top. If the size of a prediction unit is different from the size of a transform unit when intra prediction is performed, however, intra prediction may be performed using reference pixels based on the transform unit. Furthermore, intra prediction using an N×N partition may be performed on only a minimum coding unit.

In an intra prediction method, after a Mode Dependent Intra Smoothing (MDIS) filter is applied to a reference pixel depending on a prediction mode, a prediction block may be generated. The type of MDIS filter to which the reference pixel is applied may be different. Furthermore, in order to perform the intra prediction method, after intra prediction is performed, prediction may be performed along with a reference pixel using an additional filter, and then additional filtering may be performed on some columns that are present in a prediction unit. The filtering on some columns presented in the prediction unit after the reference pixel and the prediction are performed may be different depending on the directivity of a prediction mode.

The inter prediction module 106 may generate a prediction unit based on information about at least one of a picture anterior to a current picture and a picture posterior to the current picture. The inter prediction module 106 may include a reference picture interpolation unit, a motion estimation unit, and a motion compensation unit.

The reference picture interpolation unit may be provided with information about a reference picture from the memory 150 and may generate information about pixels equal to or less than an integer pixel in the reference picture. In the case of a luma pixel, a DCT-based 8-tap interpolation filter using different filter coefficients in order to generate information about pixels equal to or less than an integer pixel in a ¼ pixel unit may be used. In the case of a chroma signal, a DCT-based 4-tap interpolation filter using different filter coefficients in order to generate information about pixels equal to or less than an integer pixel in a ⅛ pixel unit may be used.

The inter prediction module 106 may perform motion prediction based on a reference picture interpolated by the reference picture interpolation unit. Various methods, such as a Full search-based Block Matching Algorithm (FBMA), Three Step Search (TSS), and a New Three-Step search algorithm (NTS), may be used as a method of calculating a motion vector. A motion vector may have a motion vector value of a ½ or ¼ pixel unit based on an interpolated pixel. The inter prediction module 106 may predict a current prediction unit using a different motion prediction method. Various methods, such as a skip method, a merge method, and an Advanced Motion Vector Prediction (AMVP) method, may be used as the motion prediction method.

A residual block including information about a residual value, that is, a difference value between a prediction unit generated by the prediction module 110 and the reconstructed block of the prediction unit, may be generated. The generated residual block may be input to the transform module 115. The transform module 115 may transform a residual block, that is, the original block to be predicted, and a prediction unit, using a transform method, such as Discrete Cosine Transform (DCT) or Discrete Sine Transform (DST). Whether DCT or DST will be applied in order to transform the residual block may be determined based on information about an intra prediction mode of a prediction unit used to generate the residual block and information about the size of the prediction unit. That is, the transform module 115 may use a different transform method based on information about the size of a prediction block.

The quantization module 120 may quantize values that have been transformed into a frequency domain by the transform module 115. A quantization coefficient may vary depending on a block or the importance of video. A value calculated by the quantization module 120 may be provided to the dequantization module 135 and the rearrangement module 125.

The rearrangement module 125 may perform the rearrangement of coefficient values on the quantized residual value. The rearrangement module 125 may change coefficients of a two-dimensional block form into a one-dimensional vector form using a coefficient scanning method. For example, the rearrangement module 125 may change coefficients of a two-dimensional block form into a one-dimensional vector form by performing scanning from DC coefficients to coefficients of a high frequency domain using a diagonal scan method. In this case, a vertical scan method of scanning coefficients of a two-dimensional block form in a column direction or a horizontal scan method of performing scanning coefficients of a two-dimensional block form in a row direction other than the diagonal scan method may be used depending on the size of a transform unit and an intra prediction mode. That is, which one of the diagonal scan method, the vertical scan method, and the horizontal scan method will be used may be determined depending on the size of a transform unit and an intra prediction mode.

The entropy coding module 130 may perform entropy coding based on values calculated by the rearrangement module 125. In this case, the entropy coding module 130 may use various coding methods, such as exponential Golomb, Context-Adaptive Variable Length Coding (CAVLC), and Context-Adaptive Binary Arithmetic Coding (CABAC).

The entropy coding module 130 may receive various pieces of information, such as information about a residual coefficient of a coding unit, information about a block type, information about a prediction mode, information about a partition module, information about a prediction unit, information about a transmission unit, information about a motion vector, information about a reference frame, information about the interpolation of a block, and filtering information, from the rearrangement module 125 and the prediction module 110 and may perform entropy coding in accordance with a specific coding method using the various pieces of information. Furthermore, the entropy coding module 130 may perform entropy coding on coefficients of a coding unit received from the rearrangement module 125.

The entropy coding module 130 may perform entropy coding using a High Efficiency Binarization (HEB) method using CABAC or a High Throughput Binarization (HTB) method using bypass coding of CABAC in a CAVLC coefficient binarization method.

The dequantization module 135 dequantizes on values quantized by the quantization module 120, and the inverse transform module 140 performs inverse transform on values transformed by the transform module 115. The residual values generated by the dequantization module 135 and the inverse transform module 140 may be combined with a prediction unit predicted through the motion estimation unit, the motion compensation unit, and the intra prediction unit of the prediction module 110, thereby being capable of generating a reconstructed block.

The filter module 145 may include at least one of a deblocking filter, an offset correction unit, and an Adaptive Loop Filter (ALF).

The deblocking filter may remove block distortion, generated due to the boundary between blocks, from a reconstructed picture. In order to determine whether or not to perform deblocking, whether or not to apply the deblocking filter to a current block may be determined based on pixels included in some columns or rows of the current block. If the deblocking filter is determined to be applied to the current block, a strong filter or a weak filter may be applied to the current block depending on required deblocking filtering strength. Furthermore, in applying the deblocking filter, horizontal filtering and vertical filtering may be performed in parallel when the vertical filtering and the horizontal filtering are performed.

The offset correction unit may correct an offset between a video on which deblocking has been performed and the original video in a pixel unit. In order to perform offset correction on a specific picture, a method of dividing pixels included in a video into a specific number of regions, determining a region on which an offset will be performed, and applying the offset to the determined region, or a method of applying an offset by taking into consideration information about the edge of each pixel may be used.

The Adaptive Loop Filter (ALF) may perform filtering based on a value obtained by comparing a filtered and reconstructed video with the original video. Pixels included in a video may be divided into one or more groups, a single filter to be applied to a corresponding group may be determined, and different filtering may be performed on each group. a luma signal among Information about whether the ALF will be applied may be transmitted for each coding unit, and the size and coefficients of the ALF may be different depending on each block. The ALF may have various forms, and the number of coefficients included in the ALF may be different. Filtering-related information (e.g., information about filter coefficients, ALF on/off information, and information about a filter form) about the ALF may be included in a variable set in a bitstream form and transmitted.

The memory 150 may store reconstructed blocks or pictures computed by the filter module 145, and the stored reconstructed blocks or pictures may be provided to the prediction module 110 when inter prediction is performed.

Figure 2:
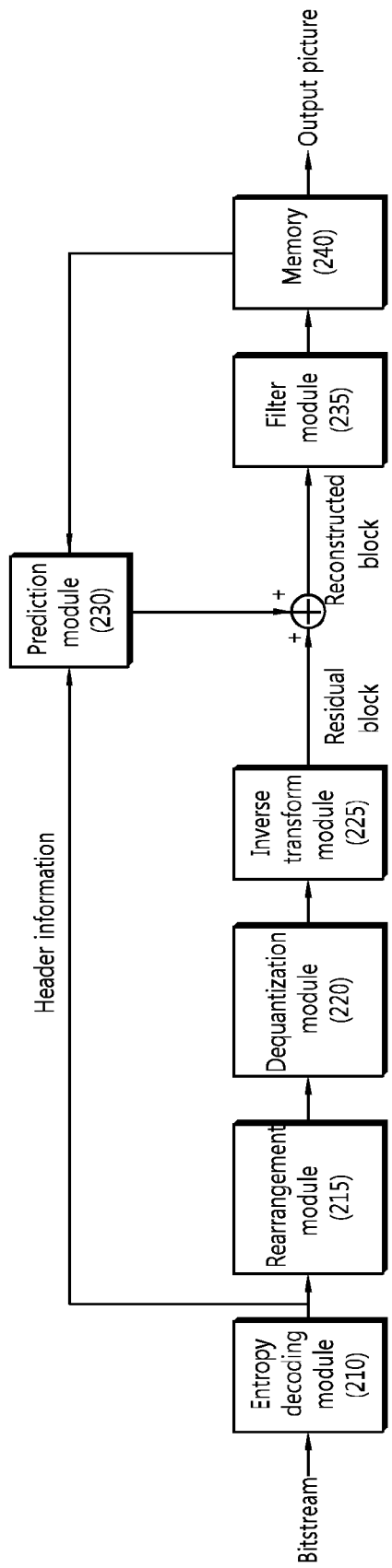
FIG. 2 is a block diagram illustrating a decoder in accordance with an embodiment of the present invention.

FIG. 2 is a block diagram illustrating a decoder in accordance with an embodiment of the present invention.

Referring to FIG. 2, the decoder may include an entropy decoding module 210, a rearrangement module 215, a dequantization module 220, an inverse transform module 225, a prediction module 230, a filter module 235, and memory 240.

When a bitstream is received from a coder, the input bitstream may be decoded in a procedure opposite the procedure of the coder.

The entropy decoding module 210 may perform entropy decoding in a procedure opposite the procedure performed by the entropy coding unit of the coder. Information for generating a prediction unit, from among pieces of information decoded by the entropy decoding module 210, may be provided to the prediction module 230. Residual values obtained by performing the entropy decoding through the entropy decoding module 210 may be input to the rearrangement module 215.

Like the entropy coding unit, the entropy decoding module 210 may perform inverse transform using at least one of the HEB method using CABAC and an HTB method using a coefficient coding method of CAVLC.

The entropy decoding module 210 may decode information related to intra prediction and inter prediction that has been performed by the coder. If there is a restriction, such as that a surrounding prediction mode is not available, for example, when the coder performs intra prediction and inter prediction as described above, the entropy decoding module 210 may perform entropy decoding based on such a restriction and receive information about a current block that is related to intra prediction and inter prediction.

The rearrangement module 215 may perform rearrangement on a bitstream on which entropy decoding has been performed by the entropy decoding module 210 based on a rearrangement method performed by the coder. The rearrangement module 215 may rearrange coefficients represented in a one-dimensional vector form by reconstructing the coefficients into coefficients of a two-dimensional block form. The rearrangement module 215 may receive information related to the scanning of coefficients performed by the coder and perform rearrangement on the information using an inverse scanning method based on a scanning sequence performed by the coder.

The dequantization module 220 may perform dequantization based on a quantization variable provided by the coder and the coefficient values of a rearranged block.

The inverse transform module 225 may perform inverse DCT and inverse DST on the results of quantization performed by the coder with respect to DCT and DST performed by the transform unit of the coder. The inverse DCT and inverse DST may be performed based on a transmission unit determined by the coder. The transform unit of the coder may selectively perform DCT and DST based on a plurality of pieces of information, such as a prediction method, the size of a current block, and a prediction direction. The inverse transform module 225 of the decoder may perform inverse DCT and inverse DST based on transform information that has been performed by the transform unit of the coder.

In this case, the inverse transform module 225 may perform the inverse DCT and the inverse DST based on a coding unit not based on a transform unit.

The prediction module 230 may generate a prediction block based on information related to the generation of a prediction block that has been provided by the entropy decoding module 210 and information about a previously decoded block or picture that has been provided by the memory 240.

Like in the operation of the coder as described above, if the size of a prediction unit is the same as that of a transform unit when intra prediction is performed, the intra prediction is performed on a prediction unit based on pixels on the left of the prediction unit, pixels at the left top of the prediction unit, and pixels at the top of the prediction unit. If the size of the prediction unit is different from that of the transform unit when the intra prediction is performed, the intra prediction may be performed using a reference pixel based on a transform unit. Furthermore, intra prediction using an N×N partition may be used for only a minimum coding unit.

The prediction module 230 may include a prediction unit determination module, an inter prediction module, and an intra prediction module. The prediction unit determination module may receive various pieces of information, such as information about a prediction unit, information about the prediction mode of an intra prediction method, and information related to the motion prediction of the inter prediction method, from the entropy decoding module 210, may detect a prediction unit in a current coding unit, and may determine whether inter prediction or intra prediction is performed on the prediction unit. The inter prediction unit may perform inter prediction on a current prediction unit based on information, included in at least one of a picture anterior to a current picture including the current prediction unit or a picture posterior to the current picture, using information required to perform the inter prediction on the current prediction unit that has been provided by the coder. In order to perform the inter prediction, the inter prediction unit may determine whether a motion prediction method of a prediction unit included in a corresponding coding unit is any one of a skip mode, a merge mode, and an AMVP mode based on the coding unit.

The intra prediction unit may generate a prediction unit based on information about pixels within a current picture. If the prediction unit is a prediction unit on which intra prediction has been performed, the intra prediction unit may perform intra prediction based on information about the intra prediction mode of a prediction unit that has been provided by the coder. The intra prediction unit may include an MDIS filter, a reference pixel interpolation unit, and a DC filter. The MDIS filter is a part configured to perform filtering on the reference pixel of a current block. Whether or not to apply the filter may be determined based on a prediction mode of a current prediction unit, and a determined filter may be applied. MDIS filtering may be performed on the reference pixel of the current block based on information about the prediction mode of the current prediction unit and the MDIS filter that have been provided by the coder. If the prediction mode of the current block is in a mode in which MDIS filtering is not performed, the MDIS filter may not be applied. Furthermore, like in the coder, after a prediction block is generated, filtering may be additionally performed along with a reference pixel.

If a prediction mode of a prediction unit is a prediction unit on which intra prediction is performed based on a pixel value obtained by interpolating a reference pixel, the reference pixel interpolation unit may generate a reference pixel of a pixel unit equal to or smaller than an integer value by interpolating the reference pixel. If a prediction mode of a current prediction unit is a prediction mode in which a prediction block is generated without interpolating a reference pixel, the reference pixel may not be interpolated. If the prediction mode of a current block is a DC mode, the DC filter may generate a prediction block through filtering.

A reconstructed block or picture may be provided to the filter module 235. The filter module 235 may include a deblocking filter, an offset correction unit, and an ALF.

Information about whether the deblocking filter has been applied to a corresponding block or picture and information about whether a strong filter or a weak filter has been applied if the deblocking filter has been applied may be received from the coder. The deblocking filter of the decoder may receive information related to the deblocking filter from the coder, and the decoder may perform deblocking filtering on a corresponding block. Like in the coder, first, the decoder performs vertical deblocking filtering and horizontal deblocking filtering, but may perform at least one of vertical deblocking and horizontal deblocking in an overlapping portion. Vertical deblocking filtering or horizontal deblocking filtering that has not been previously performed may be performed in a part in which vertical deblocking filtering is overlapped with horizontal deblocking filtering. Types of deblocking filtering can be processed in parallel through such a deblocking filtering process.

The offset correction unit may perform offset correction on a reconstructed video based on information about the type of offset correction and an offset value that have been applied to video when coding is performed.

The ALF may perform filtering based on a value obtained by comparing a reconstructed video with the original video after filtering is performed. The ALF may be applied in a coding unit based on information about whether to apply the ALF and information about ALF coefficients that have been provided by the coder. Such ALF information may be included in a specific variable set and provided.

The memory 240 may store a reconstructed picture or block so that the reconstructed picture or block is used as a reference picture or block and may provide the reconstructed picture to an output unit.

As described above, in embodiments of the present invention, although a coding unit is used as a unit on which coding is performed for convenience of description, the coding unit may be a unit on which decoding is performed.

Hereinafter, in embodiments of the present invention, a block, that is, the subject of prediction, is called the original block, and a block generated by performing intra prediction or inter prediction on the original block is called a prediction block. The prediction block may be a prediction unit or a transform unit. A prediction value generated by performing intra prediction or inter prediction on the prediction block may be called a pixel prediction value. A residual block may be generated based on a difference value between the original block and the prediction block.

Table 1 below illustrates a mapping relationship between intra prediction mode numbers and intra prediction modes.

TABLE 1

| Intra prediction mode | Associated names |
| --- | --- |
| 0 | Intra_Planar |
| 1 | Intra_DC |
| Otherwise (2 . . . 34) | Intra_Angular |
| 35 | Intra_FromLuma (used only for chroma) |

Referring to Table 1, in order to perform intra prediction on a target prediction block, a luma block may use 35 intra prediction modes. A No. 2 intra prediction mode to a No. 34 intra prediction mode of the 35 intra prediction modes are directional intra prediction modes. In the Nos. 2 to 34 intra prediction modes, intra prediction may be performed based on a reference pixel in a different direction. No. 0 and No. 1 intra prediction modes are non-directional intra prediction modes. In the Nos. 0 and 1 intra prediction modes, the prediction pixel value of a prediction block may be generated using a reference pixel, and intra prediction may be performed. In this case, the prediction mode number of an intra-mode is only an indicator, and each prediction mode is not limited to a specific number.

Figure 3:
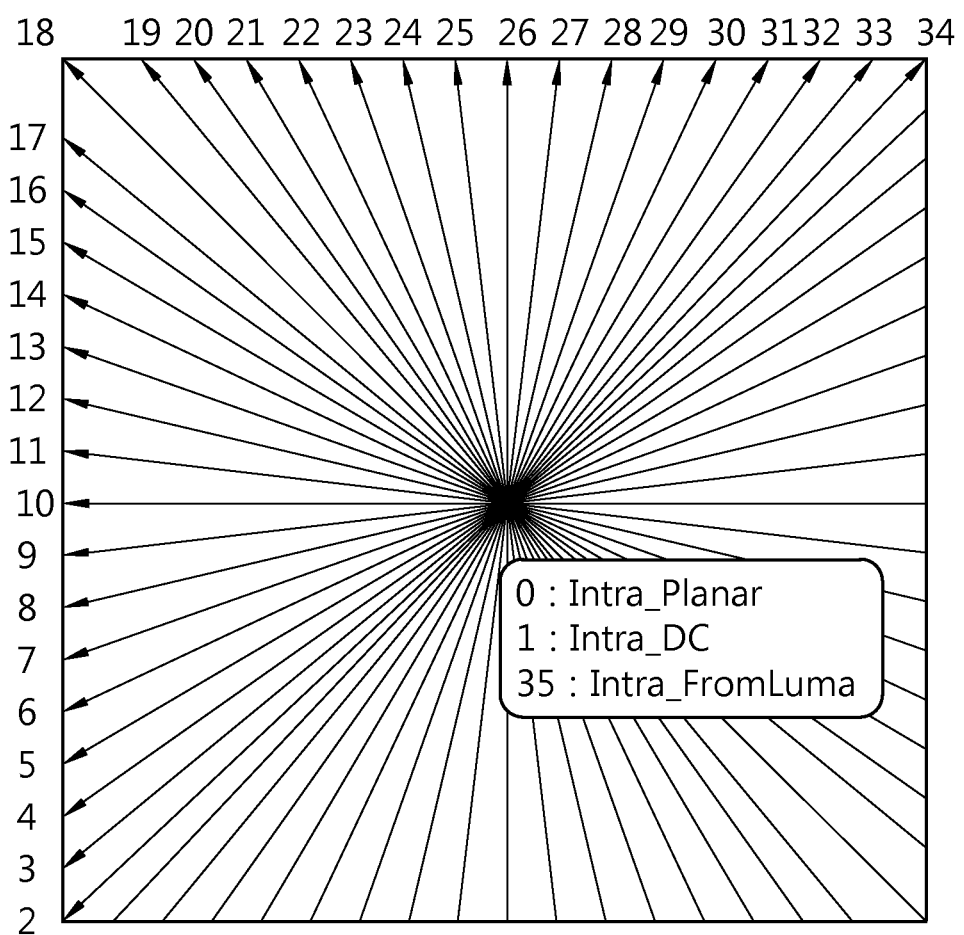
FIGS. 3 and 4 are conceptual diagrams illustrating directional intra prediction modes in accordance with an embodiment of the present invention.
Figure 4:
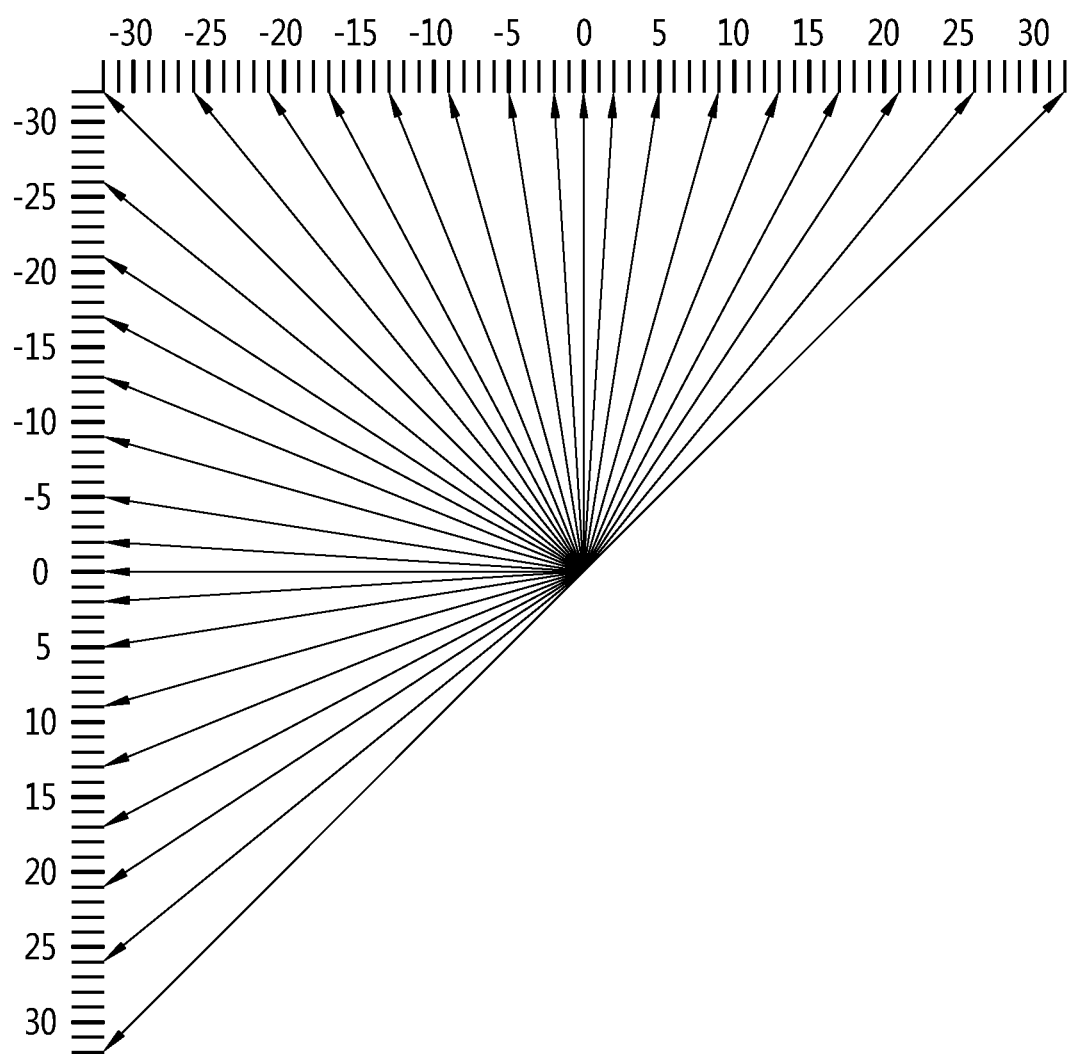

FIGS. 3 and 4 are conceptual diagrams illustrating directional intra prediction modes in accordance with an embodiment of the present invention.

Referring to FIG. 3, in the directional intra prediction modes, intra prediction mode values may be clockwise allocated from the No. 2 intra prediction mode at the left bottom to the No. 34 intra prediction mode.

FIG. 4 illustrates that the No. 2 to No. 34 intra prediction modes of FIG. 3 are classified according to angles.

Table 2 below is a table in which the intra prediction modes "intraPredMode" have been mapped with pieces of variable information "intraPredAngle" related to the intra prediction angles in FIG. 4. The intra prediction modes "intraPredMode" and the pieces of variable information "intraPredAngle" may have the following mapping relationship.

TABLE 2

| | intraPredMode | | | | | | | | | | | | | | | | |
| --- | --- | --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 | 15 | 16 |
| intraPredAngle | — | — | 32 | 26 | 21 | 17 | 13 | 9 | 5 | 2 | — | −2 | −5 | −9 | −13 | −17 | −21 |

| | intraPredMode | | | | | | | | | | | | | | | | | |
| --- | --- | --- | --- | --- | --- | --- | --- | --- | --- | --- | --- | --- | --- | --- | --- | --- | --- | --- |
| | 17 | 18 | 19 | 20 | 21 | 22 | 23 | 24 | 25 | 26 | 27 | 28 | 29 | 30 | 31 | 32 | 33 | 34 |
| intraPredAngle | −26 | −32 | −26 | −21 | −17 | −13 | −9 | −5 | −2 | — | 2 | 5 | 9 | 13 | 17 | 21 | 26 | 32 |

Referring to FIGS. 3 and 4, in the intra prediction mode, a prediction direction may be different depending on the number of an intra prediction mode. A size distribution of residual values, that is, a pixel value difference between a prediction block and the original block may be different depending on the prediction direction of an intra prediction mode.

For example, if intra prediction has been performed on a specific prediction block using a vertical directivity prediction mode (e.g., the No. 26 intra prediction mode), there is a good possibility that the value of a prediction pixel placed at the top boundary of the prediction block may similar to that of a reference pixel because the prediction pixel placed at the top boundary of the prediction block is close to the reference pixel. Accordingly, there is a good possibility that a residual value, that is, a difference value between the prediction block and the original block, may be small, but there is a possibility that the accuracy of prediction may be low and the residual value may be high because a possibility that the value of a prediction pixel placed at the bottom of the prediction block may be similar to that of the original pixel is low. Accordingly, the size of the residual value may be increased from the top row of a target prediction block to the bottom row depending on the directivity of an intra prediction mode.

For another example, if intra prediction has been performed on a specific prediction block using a horizontal directivity prediction mode (e.g., the No. 10 intra prediction mode), there is a good possibility that that the value of a prediction pixel placed at the left boundary of the prediction block may be similar to the pixel value of the original block because the prediction pixel placed at the left boundary of the prediction block is close to a reference pixel, but a possibility that the value of a prediction pixel placed at the right boundary of the prediction block may be similar to the pixel value of the original block is low and thus the accuracy of prediction may be low because the prediction pixel placed at the right boundary of the prediction block becomes distant from the reference pixel. Accordingly, the residual value may be increased from the left of the prediction block to the right.

A residual value may be transformed into a frequency domain through transform. A block transformed into a frequency domain in a subsequent entropy coding step may be coded using a smaller number of bits only when transform is performed on a residual block including a residual value using an appropriate transform method based on the size and distribution of residual values. In this case, in order to determine the appropriate transform method, both the tendency of a residual information value size and information about the size of a prediction block may be additionally taken into consideration. The number of pixels that become distant from a reference pixel is relatively increased when the size of a prediction block is increased rather than when the size of the prediction block is small. Accordingly, a different transform method may be applied to a residual block by additionally taking into consideration the size of a prediction block in addition to the tendency of residual information according to a prediction mode.

A transform method using Discrete Sine Transform (DST) may improve coding efficiency depending on the characteristics of a sine wave, if the transform method is used in a transform method for a residual block in which the size of a residual value is increased as the residual value becomes distant from the location of a reference pixel as in the aforementioned vertical or horizontal directivity prediction mode.

In accordance with an embodiment of the present invention, in order to improve coding efficiency, intra prediction may be performed using a different transform method depending on an intra prediction mode and the size of a prediction block. For example, a transform method applied to the residual value of a prediction block that satisfies a condition on the basis of a specific size may be different from a transform method applied to the residual value of a block that does not satisfy a condition on the basis of a specific size.

Figure 5:
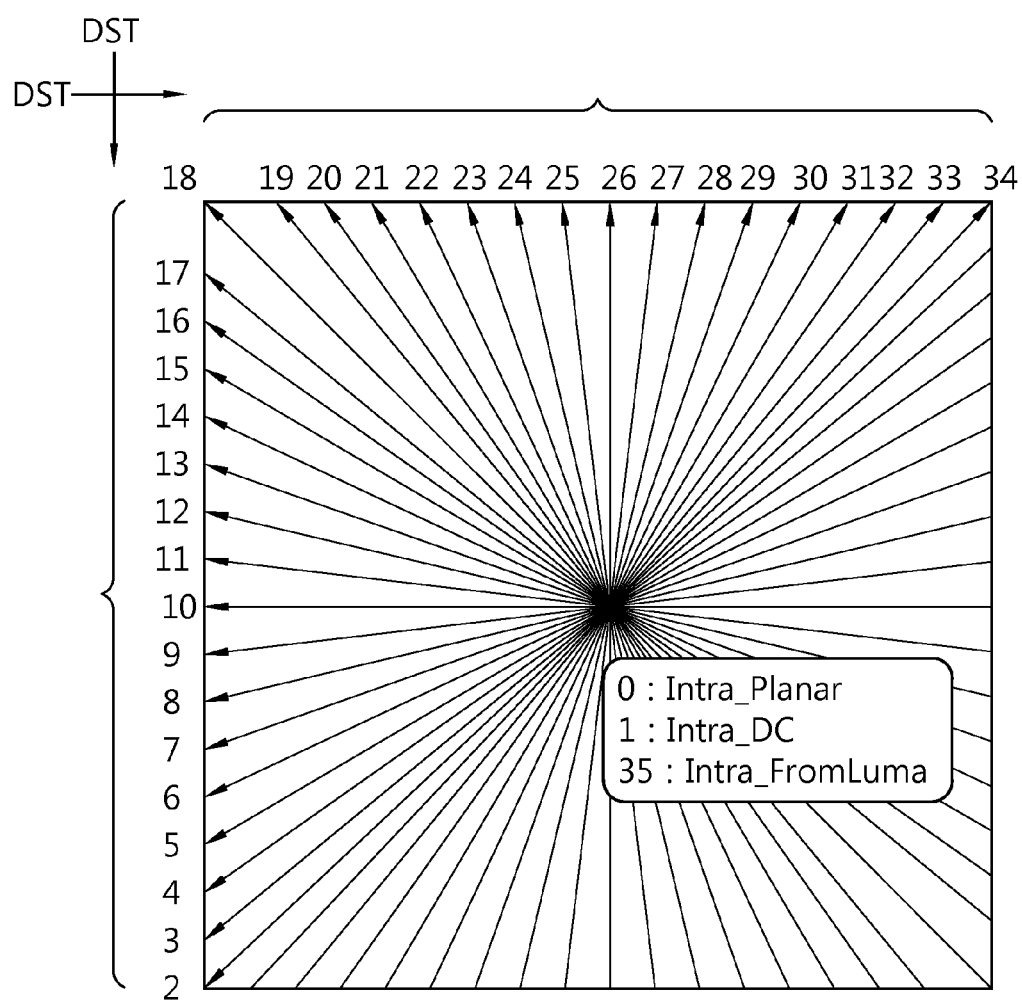
FIG. 5 is a conceptual diagram illustrating one of transform methods when the size of a prediction block is smaller than a specific size in accordance with an embodiment of the present invention.
Figure 5:
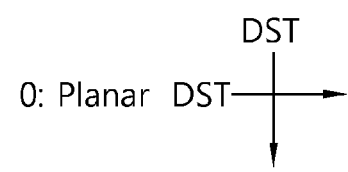
Figure 5:
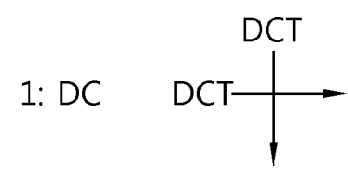

FIG. 5 is a conceptual diagram illustrating one of transform methods when the size of a prediction block is smaller than a specific size in accordance with an embodiment of the present invention.

Referring to FIG. 5, in both a vertical transform method and a horizontal transform method, DST may be performed in modes from the No. 2 intra prediction mode to the No. 34 intra prediction mode, that is, directional intra prediction modes.

For example, a block of a specific size may be a prediction block of a 4×4 size. The block of a 4×4 size corresponds to the size of a prediction block having the smallest unit, and the tendency of a residual value distribution according to the relationship between the location of a reference pixel and the location of a prediction pixel may clearly appear compared to a block having another size. That is, as the location of a reference pixel and the location of a prediction pixel used for prediction become close to each other, a residual value is small because similarity between the original pixel and the prediction pixel is increased. If the location of the reference pixel becomes distant from the location of the prediction pixel, the residual value may be increased because similarity between the original pixel and the prediction pixel is reduced. If such a tendency is present, compression efficiency can be further improved when a transform method based on a sine curve, such as DST, is used as described above. Accordingly, if the size of a prediction block is equal to or smaller than a specific size, DST may be used as a transform method in all the intra prediction mode directions. In accordance with an embodiment of the present invention, in order to represent information about the size of a prediction block, a different transform method may be applied when the value of the width "nW" and height "nH" of a target prediction block is a specific value or lower or satisfies a specific value based on information about the width "nW" and height "nH".

In the case of a planar mode of the non-directional intra prediction modes, there is a tendency that a similar mode according to the distance between a reference pixel and a prediction pixel may be present. Accordingly, like in the directional intra prediction modes, a transform method using DST in a horizontal direction and DST in a vertical direction may be used. In the case of a DC mode, transform may be performed using DCT in both the horizontal and vertical directions because a prediction pixel is predicted using an average value of all the reference pixels and thus directivity is not present.

The embodiment of FIG. 5 may also be represented by the following representation method.

PredMode is a variable indicative of whether a prediction block uses an intra prediction mode or an inter prediction mode, and IntraPredMode is a variable is indicative of an intra prediction mode. cIdx is a variable indicative of a color configuration and is indicative of a luma block of a variable value is 0. nW is a variable indicative of the width value of a prediction block, nH is a variable indicative of the height value of a prediction block, vertTrType is a variable indicative of information about a vertical transform type, and horizTrType is a variable indicative of information about a horizontal transform type. Assuming that a transform method using DCT when a variable value is 0 and a transform method using DST when a variable value is 1 are used, a transform method used when the size of a prediction block satisfies a specific condition may be represented as follows.

In a first representation method,

Depending on PredMode and IntraPredMode, the following is applied:

If PredMode is equal to MODE_INTRA, Log 2(nW*nH) is equal to 4, and cIdx is equal to 0, the variables horizTrType and vertTrType are specified as follows.

If IntraPredMode is equal to Intra_DC, the variables horizTrType and vertTrType are set equal to 0.

Otherwise, the variables horizTrType and vertTrType are set equal to 1.

Otherwise, the variables horizTrType and vertTrType are set equal to 0.

Alternatively, in a second representation method,

Depending on PredMode and IntraPredMode, the following is applied:

If PredMode is equal to MODE_INTRA, IntraPredMode is not equal to Intra_DC, Log 2(nW*nH) is equal to 4, and cIdx is equal to 0, the variables horizTrType and vertTrType are set equal to 1.

Otherwise, the variables horizTrType and vertTrType are set equal to 0.

In the first representation and the second representation, "Log 2(nW*nH) is equal to 4" includes that a specific size of a prediction block to which the present invention is applied is limited. Regarding the size of a prediction block to which the present invention is applied, a transform method, such as that described above, is applied to a prediction block of a different size, for example, a prediction block of an 8×8 size or a prediction block of a 16×16 size. This is also included in the scope of the present invention. That is, as described above, determining whether the size of a prediction block is a prediction block of a 4×4 size is only an embodiment. In some embodiments, whether the size of a prediction block satisfies a specific condition may be determined, and a transform method, such as that described above, may be performed on a prediction block having a different size that satisfies the specific condition. This is also included in the scope of the present invention.

The specific condition on which a transform method, such as that described above, is performed may be applied to a case where the size of a prediction block is a specific size or smaller or a case where the size of a prediction block corresponds to specific size. Table 3 below is a table in which transform methods are arranged when the size of a prediction block is a specific size or satisfies a specific size condition.

If the size of a prediction block does not satisfy a specific condition, DCT may be used in both vertical and horizontal transform methods regardless of the directivity of an intra prediction mode.

If the size of a prediction block satisfies a specific size condition, a transform method according to an intra prediction mode may be configured according to a table in which intra prediction modes have been mapped with transform methods, such as Table 3. However, a transform method according to a current intra prediction mode may be determined based on a specific determination algorithm even without the table.

Figure 6:
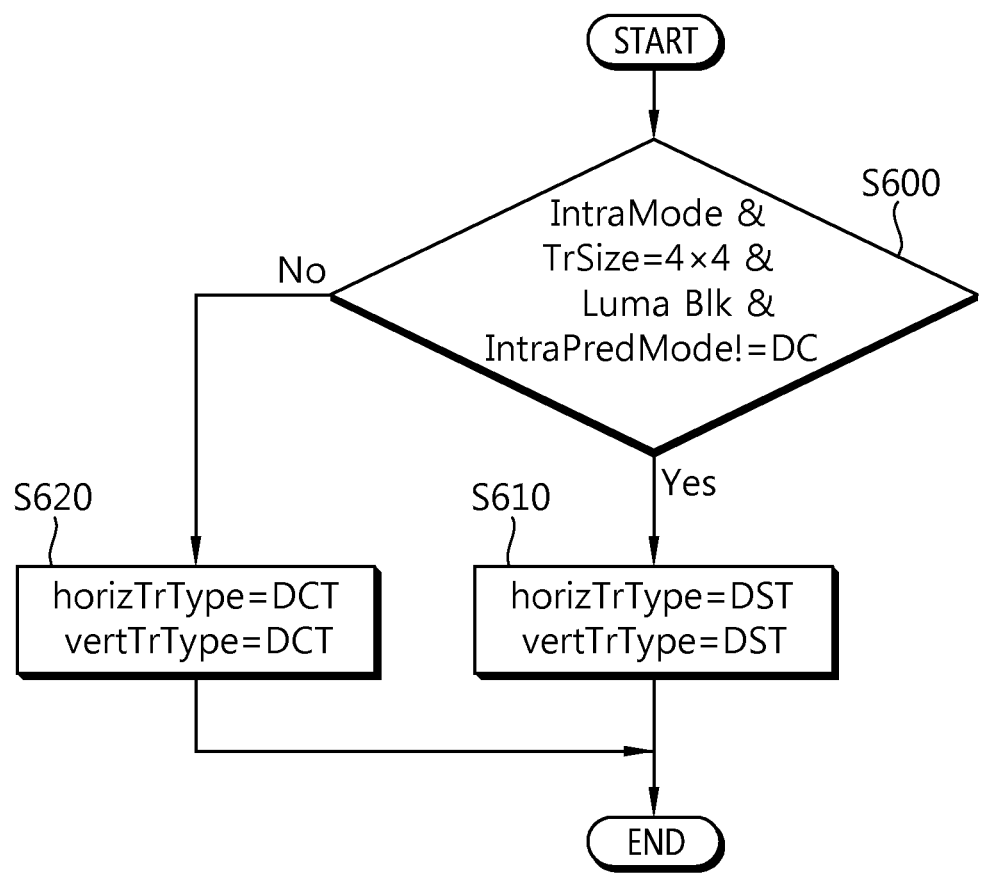
FIG. 6 is a flowchart illustrating a method of determining a transform method according to an intra prediction mode in accordance with an embodiment of the present invention.

FIG. 6 is a flowchart illustrating a method of determining a transform method according to an intra prediction mode in accordance with an embodiment of the present invention.

Referring to FIG. 6, whether information about a target prediction block has been predicted in accordance with an intra prediction method, whether the size of the prediction block satisfies a specific condition, whether the prediction block is a block of a luma sample, and whether a current intra prediction mode is a DC mode are determined at step S600.

For example, a transform method using DST may be performed in horizontal and vertical directions on a block that belongs to luma sample blocks on which an intra prediction mode has been performed as in FIG. 5, that has a 4×4 size, and that is not a DC mode. Accordingly, information about a current prediction block is determined at step S600, and whether or not to perform a transform method using DST in the vertical and horizontal directions is determined. To determine whether the size of the prediction block satisfies a 4×4 size at step S600 is only one embodiment in which whether the size of the prediction block satisfies a specific condition is determined.

A transform method using DST is performed in the horizontal and vertical directions at step S610.

If the conditions at step S600 are satisfied, the transform method using DST may be performed in the horizontal and vertical directions.

A transform method using DCT is performed in the horizontal and vertical directions at step S620.

If the conditions at step S600 are not satisfied, the transform method using DCT may be performed in the horizontal and vertical directions. For example, if the size of the prediction block is greater than the 4×4 size or an intra prediction mode used to predict the prediction block is a DC mode, the transform method using DCT may be used as a horizontal and a vertical transform method.

TABLE 3

| | IntraPredMode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| vertTrType | 1 | 0 | 1 | 1 | 1 | 1 | 1 | 1 | 1 | 1 | 1 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| | IntraPredMode | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| vertTrType | 1 | 1 | 1 | 1 | 1 | 1 | 1 | 1 | 1 | 1 | 1 | 1 | 1 | 1 | 1 | 1 | 1 | |
| horizTrType | 1 | 1 | 1 | 1 | 1 | 1 | 1 | 1 | 1 | 1 | 1 | 1 | 1 | 1 | 1 | 1 | 1 | |

Referring to Table 3, different transform methods may be used depending on all the intra prediction modes other than a DC mode.

If a process, such as that of FIG. 6, is used, there are advantages in that a memory bandwidth can be reduced because information loaded onto the memory is reduced by not using a table that represents the mapping relationship, such as that of Table 3, and that the complexity of the coder and the decoder can be reduced because unnecessary access to a table is omitted.

A transform method in accordance with an embodiment of the present invention may use a transform method defined below.

Depending on PredMode and IntraPredMode, the following is applied:

If PredMode is equal to MODE_INTRA, Log 2(nW*nH) is equal to 4, and cIdx is equal to 0, the variables horizTrType and vertTrType are set equal to 1.

Otherwise, the variables horizTrType and vertTrType are set equal to 0.

Information about a prediction block is predicted in accordance with an intra prediction method. If the size of a transform block is 4×4 and the transform block is a block of a luma sample, a transform method using DST in a horizontal direction and DCT in a vertical direction may be performed on directional and non-directional intra prediction modes. That is, when the prediction mode of the block is a mode that is predicted using the intra prediction, the size of block is 4×4, and the block is a luma sample block, the DST may be used as the transform method.

In this case, in the case of a DC mode of the non-directional modes, a prediction block is produced using an average value of all the reference pixels, and filtering is performed on a prediction pixel along with the values of reference pixels placed at the top and on the left within the prediction block. If such filtering is performed on the DC mode, similarity is high as the distance between the reference pixel and the prediction pixel is close and similarity is low as the distance between the reference pixel and the prediction pixel is distant. That is, if the distance between the reference pixel and the prediction pixel becomes distant, the accuracy of prediction is low because a possibility that the original block and the prediction block may be similar to each other is low. As a result, the size of a residual value may be increased from the top row of the prediction block to the bottom row or from the left to the right. In such a case, if a transform method using DST is performed in the vertical and horizontal directions, coding efficiency may be improved. As a result, if DST using a vertical transform method and a horizontal transform method is performed on all the intra prediction modes, coding efficiency can be improved.

In accordance with an embodiment of the present invention, in a case where filtering has been performed on a prediction block on which intra prediction has been performed using a DC mode, intra prediction may be performed on a prediction block on which intra prediction has been performed based on a DC mode using a transform method using DST as vertical and horizontal transform methods.

Figure 7:
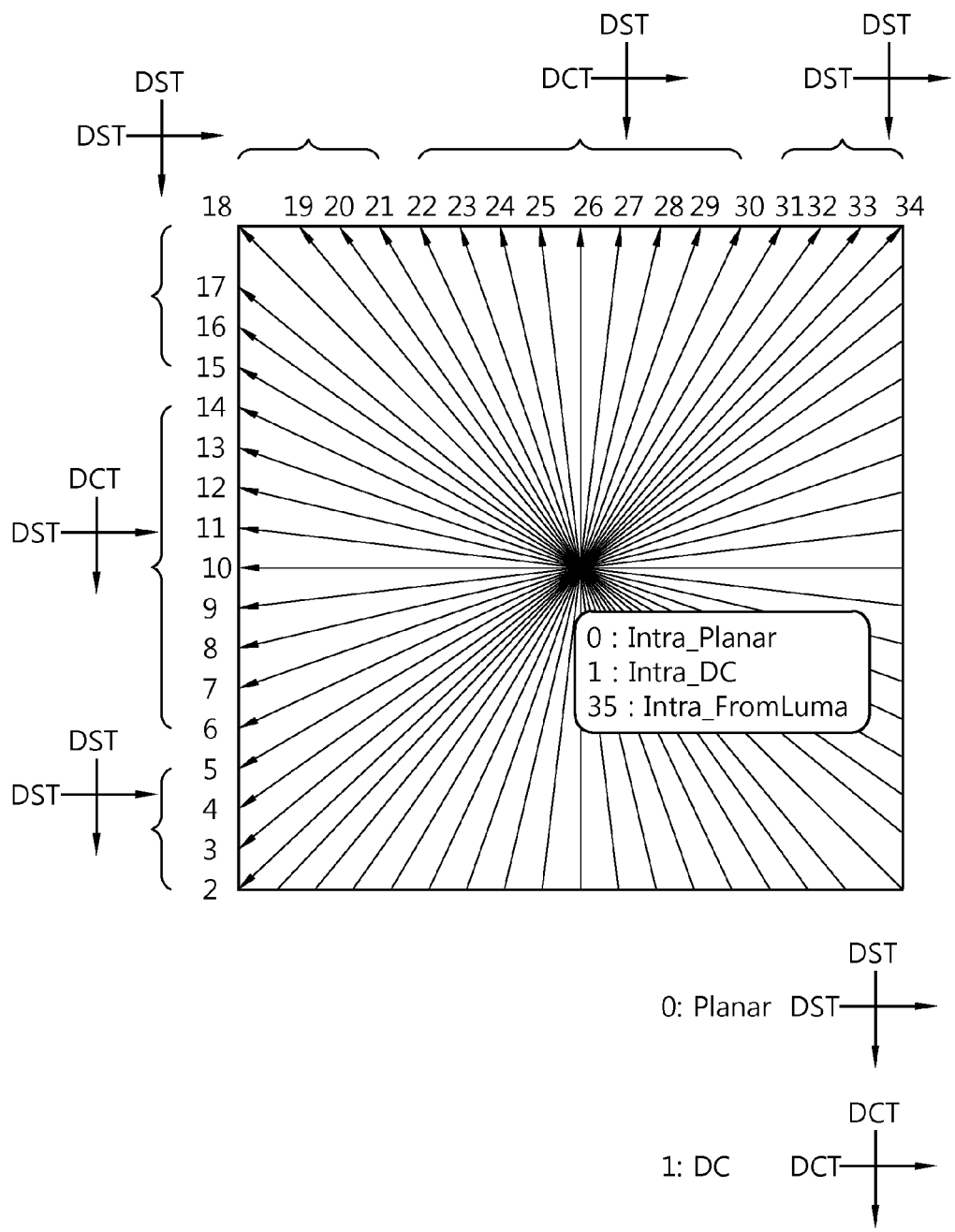
FIG. 7 is a conceptual diagram illustrating one of transform methods when the size of a prediction block is a specific size or smaller in accordance with an embodiment of the present invention.

FIG. 7 is a conceptual diagram illustrating one of transform methods when the size of a prediction block satisfies a specific condition in accordance with an embodiment of the present invention.

In FIG. 7, transform may be performed using a different transform method based on an intra prediction mode.

Transform may be performed using a transform method using DST both in horizontal and vertical directions if the number of an intra prediction mode is No. 2 to No. 5 depending on intra prediction modes, a prediction method using DST in a horizontal direction and a transform method using DCT in a vertical direction if the number of an intra prediction mode is No. 6 to No. 14, a transform method using DST both in horizontal and vertical directions if an intra prediction mode is No. 15 to No. 21, a transform method using DST in a vertical direction and a transform method using DCT in a horizontal direction if an intra prediction mode is No. 22 to No. 30, and a transform method using DST both in vertical and horizontal directions if an intra prediction mode is No. 31 to No. 34. A transform method, such as that described above, basically uses DST as in FIG. 5. However, in the case of an intra prediction mode in which prediction is performed in horizontal and vertical directions and the tendency of a prediction direction is strong, such as intra prediction modes from the No. 6 intra prediction mode to the No. 14 intra prediction mode or from the No. 22 intra prediction mode to the No. 30 intra prediction mode, a transform method in the direction in which is opposite to in the direction in which the tendency is strong may be performed using a transform method using DCT not DST.

After a transform method, such as that described above, is performed, a scan method (or a rearrangement method) performed after transform coefficients are quantized may use a different scan method depending on a transform method. For example, if an intra prediction mode uses DST in horizontal and vertical directions as in Nos. 2~5, Nos. 15~21, and Nos. 31~34, rearrangement may be performed using a diagonal scan method. If intra prediction is performed in a horizontal direction as in No. 6 to No. 14, a vertical scan method may be used. If intra prediction is performed in a vertical direction as in No. 22 to No. 3, a horizontal scan method may be used.

A transform method, such as that of FIG. 7, may be represented by the following table.

Depending on PredMode and IntraPredMode, the following is applied:

If PredMode is equal to MODE_INTRA, Log 2(nW*nH) is equal to 4, and cIdx is equal to 0, the variables horizTrType and vertTrType are specified as Table 4 with IntraPredMode as input.

Otherwise, the variables horizTrType and vertTrType are set equal to 0.

"Log 2(nW*nH) is equal to 4" illustratively represents a case where a prediction block satisfies a specific size condition as described above. Another condition may be used as a condition on which a comparison is performed on the size of a prediction block, and such an embodiment is also included in the scope of the present invention.

TABLE 4

| | IntraPredMode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| vertTrType | 1 | 0 | 1 | 1 | 1 | 1 | 0 | 0 | 0 | 0 | 0 | 0 | 0 | 0 | 0 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |

TABLE 4-continued

| | IntraPredMode | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| vertTrType | 1 | 1 | 1 | 1 | 1 | 1 | 1 | 1 | 1 | 1 | 1 | 1 | 1 | 1 | 1 | 1 | 1 |
| horizTrType | 1 | 1 | 1 | 1 | 0 | 0 | 0 | 0 | 0 | 0 | 0 | 0 | 0 | 1 | 1 | 1 | 1 |

In accordance with an embodiment of the present invention, Table 4 is a table in which transform methods according to intra prediction modes are arranged. Table 4 may be stored, and a transform method based on an intra prediction mode may be derived based on the mapping table. In another embodiment, a transform method based on an intra prediction mode may be derived through a specific determination process without using Table 4.

Figure 8:
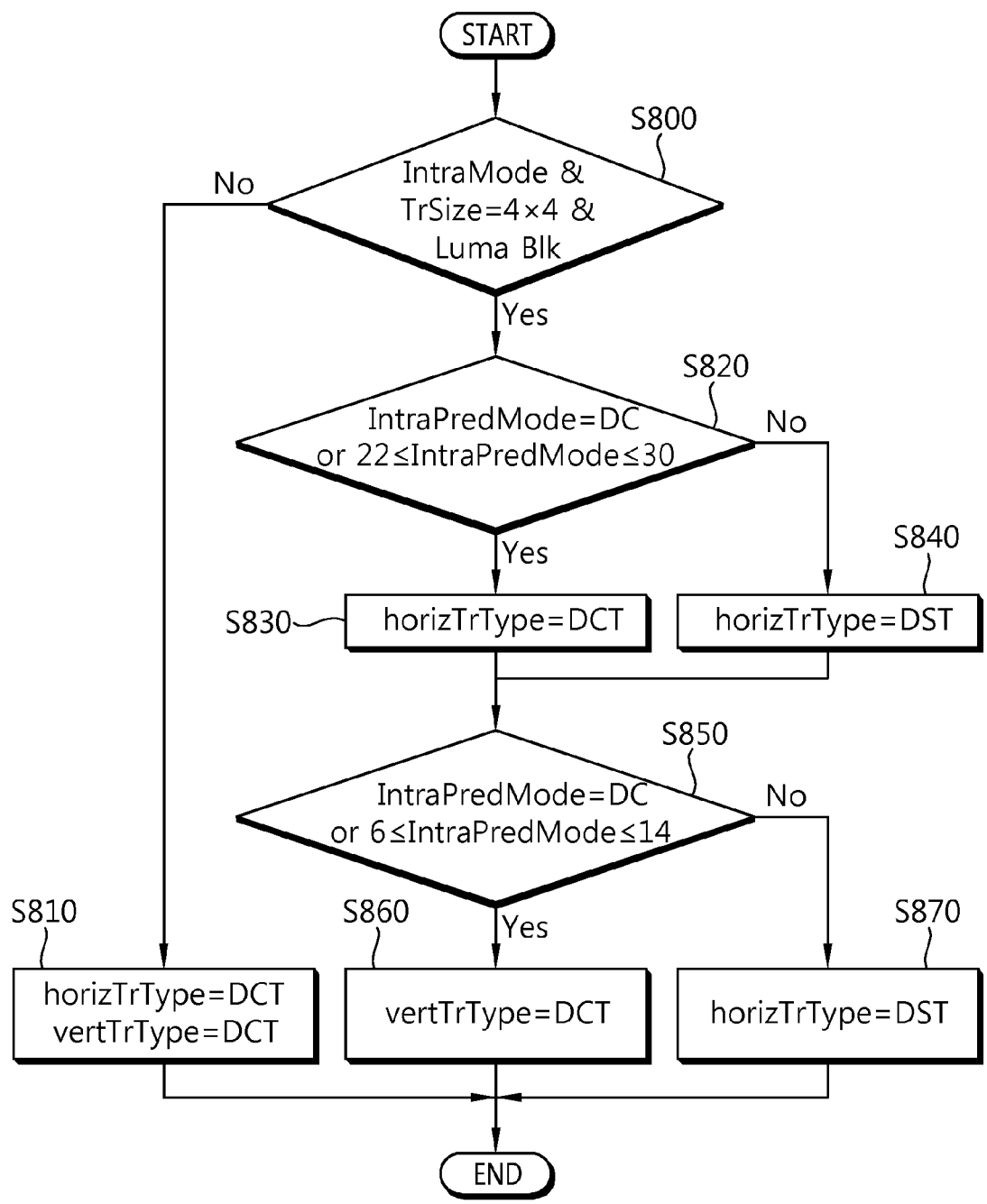
FIG. 8 is a flowchart illustrating a method of deriving a transform method in accordance with an embodiment of the present invention.

FIG. 8 is a flowchart illustrating a method of deriving a transform method in accordance with an embodiment of the present invention.

Referring to FIG. 8, whether a prediction block has been predicted using an intra prediction mode, whether the size of a current prediction block satisfies a specific condition, and whether the prediction block is a luma block are determined at step S800.

For example, whether the prediction block has been predicted using an intra prediction mode, whether the size of the current prediction block satisfies a 4×4 size, and whether the prediction block is a luma block are determined. To determine whether the size of the prediction block disclosed at steps S800 and S810 of FIG. 8 satisfies a 4×4 size is an embodiment in which whether the size of the prediction block satisfies a specific condition is determined.

If the prediction block has not been predicted using an intra prediction mode, the size of the current prediction block does not satisfy the specific condition, and the prediction block is not a luma block, a transform method using DCT may be selected as a horizontal transform method, and a transform method using DCT may be selected as a vertical transform method at step S810.

For example, if the prediction block has been predicted using an intra prediction mode, the size of the current prediction block is 4×4, and the prediction block is a luma block, a horizontal transform method and a vertical transform method may be differently performed depending on the number of an intra prediction mode. Hereinafter, in an embodiment of the present invention, a process of determining a transform method based on an intra prediction mode is disclosed, but the process of determining a transform method based on an intra prediction mode may be changed in its sequence. Such an embodiment is also included in the scope of the present invention.

In order to determine a horizontal transform method, whether an intra prediction mode is a DC mode or whether the intra prediction mode is 22 or more to 30 or less is determined at step S820.

If, as a result of the determination at step S820, the intra prediction mode is a DC mode or the intra prediction mode is 22 or more to 30 or less, a horizontal transform method using DCT may be selected at step S830. If, as a result of the determination at step S820, the intra prediction mode is not a DC mode and the intra prediction mode is not 22 or more to 30 or less, a horizontal transform method using DST mode may be selected at step S840.

In order to determine a vertical transform method, whether an intra prediction mode is a DC or whether the intra prediction mode is 6 or more to 14 or less is determined at step S850.

If, as a result of the determination at step S850, the intra prediction mode is a DC mode or the intra prediction mode is 6 or more to 14 or less, a transform method using DCT is selected as a vertical transform method at step S860.

If, as a result of the determination at step S850, the intra prediction mode is not a DC mode or the intra prediction mode is not 6 or more to 14 or less, a transform method using DST is selected as a vertical transform method at step S870.

As in FIG. 6, there are advantages in that a memory bandwidth can be reduced because information loaded onto the memory is reduced by removing a table through a process, such as the process of FIG. 8, and that the complexity of the coder and the decoder can be reduced because unnecessary access to a table is omitted.

Figure 9:
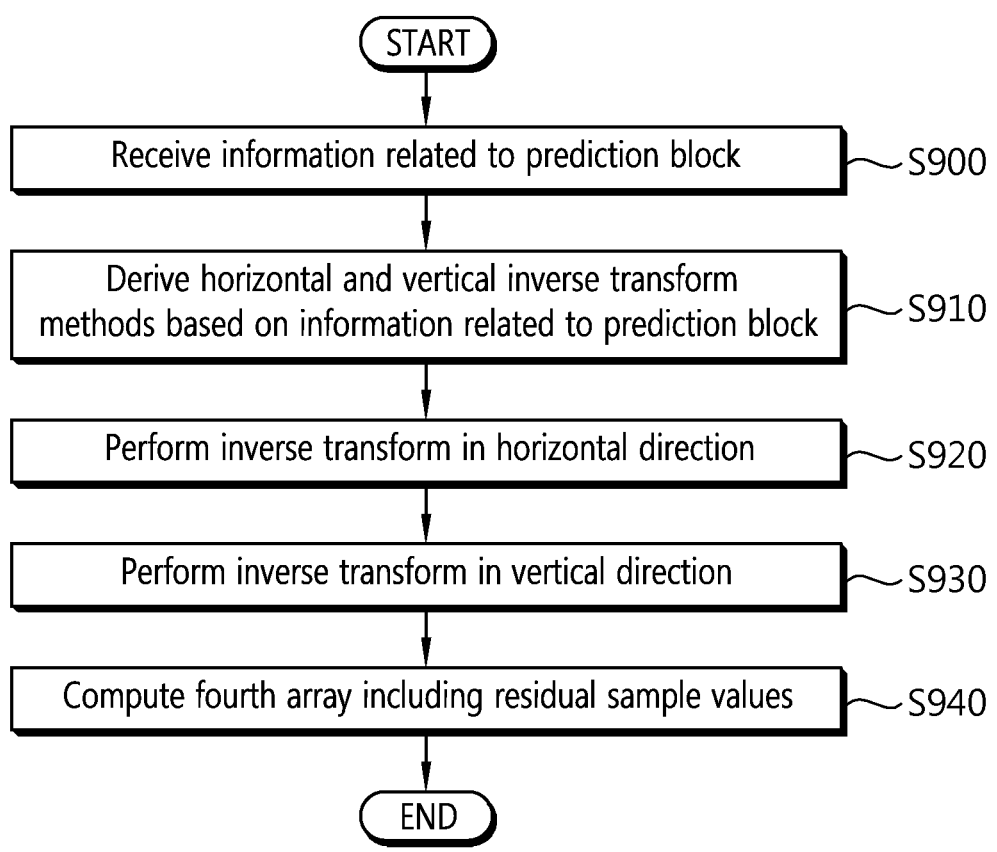
FIG. 9 is a flowchart illustrating a transform method in a decoding process in accordance with an embodiment of the present invention.

FIG. 9 is a flowchart illustrating a transform method in a decoding process in accordance with an embodiment of the present invention.

Referring to FIG. 9, in the decoding process, inverse transform may be performed on dequantized transform coefficients.

Information related to a prediction block (i.e., a target inverse transform block) is received at step S900.

In accordance with an embodiment of the present invention, an inverse transform method may be determined based on information about the size of a target prediction block and information about the intra prediction mode of the target prediction block.

The information related to the prediction block may include information about the width "nW" of the prediction block, information about the height "nH" of the prediction block, information about transform coefficients on which dequantization has been performed, sample information "cIdx", etc.

Horizontal and vertical inverse transform methods are derived based on the information related to the prediction block at step S910.

The horizontal and vertical inverse transform methods may be determined based on the contents of FIGS. 5 to 8.

For example, if the prediction block is an intra prediction mode, the size of a transform block size is 4×4, the prediction block is related to a luma sample, and an intra prediction mode in which prediction has been performed is not a DC mode, the vertical and horizontal inverse transform methods may be determined using an inverse transform method based on DST. If the conditions described above are not satisfied, inverse transform may be performed using vertical and horizontal inverse transform methods based on DCT.

According to another embodiment of the present invention, when the prediction mode of the block is a mode that is predicted using the intra prediction, the size of block is 4×4, and the block is a luma sample block, the DST may be used as the transform method. In accordance with another embodiment of the present invention, if the prediction block is an intra prediction mode, the size of a transform block is 4×4, and the prediction block is related to a luma sample, inverse transform may be performed based on a mapping table in which mapping relationships between intra prediction modes and transform methods have been established, such as Table 4, or a transform method determined based on a sequence diagram, such as that of FIG. 8.

If the prediction block is not an intra prediction mode, the size of a transform block is not 4×4, or the prediction block is not related to a luma sample, an inverse transform method based on DCT in vertical and horizontal directions may be used.

Inverse transform in a horizontal direction is performed at step S920.

In this case, the inverse transform is performed using the horizontal inverse transform method determined at step S910. The value of a second array may be calculated by performing the horizontal inverse transform method, determined at step S910, on a first array "nWxnH" generated after dequantization is performed. The value of a third array may be calculated using a specific clipping function based on the second array on which transform in a horizontal direction has been performed.

Inverse transform in a vertical direction is performed at step S930.

In this case, the inverse transform is performed using the vertical inverse transform method determined at step S910. Vertical inverse transform may be performed based on the value of the third array calculated at step S920. It is to be noted that steps S920 and S930 do not mean that they are sequentially performed. In another embodiment, steps S920 and S930 may be performed as a single step, and such an embodiment is also included in the scope of the present invention.

A fourth array including the remaining sample values is computed at step S940.

In this case, the fourth array including the remaining sample values is computed based on the value of the third array calculated at step S930 and a shift variable value calculated depending on whether a sample is a chroma sample or a luma sample.

Figure 10:
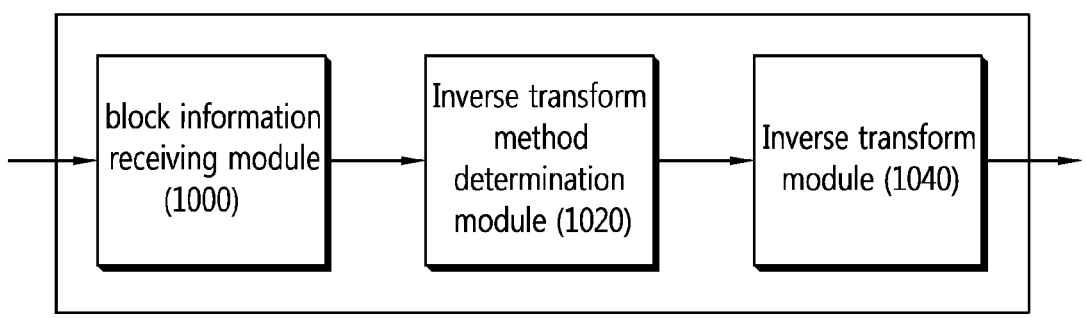
FIG. 10 is a conceptual diagram illustrating part of the decoder in accordance with an embodiment of the present invention.

FIG. 10 is a conceptual diagram illustrating part of the decoder in accordance with an embodiment of the present invention.

Referring to FIG. 10, part of the decoder may include a prediction block information input module 1000, an inverse transform method determination module 1020, and an inverse transform module 1040.

The prediction block information input module 1000 may receive information related to a prediction block, such as information about the width "nW" of the prediction block, information about the height "nH" of the prediction block, information about transform coefficients on which dequantization has been performed, and sample information "cIdx".

The inverse transform method determination module 1020 may determine an inverse transform method to be applied to the prediction block based on the information related to prediction block that has been received from the prediction block information input module 1000. The inverse transform method may be determined by a specific stored table or algorithm.

A vertical inverse transform method determination module configured to determine a vertical inverse transform method and a horizontal inverse transform method determination module configured to determine a horizontal inverse transform method may be separately implemented in the inverse transform method determination module 1020.

The inverse transform module 1040 may perform inverse transform based on the inverse transform method determined by the inverse transform method determination module 1020.

The inverse transform module 1040 may include a horizontal inverse transform unit configured to perform horizontal inverse transform and a vertical inverse transform unit configured to perform vertical inverse transform.

Although some embodiments of the present invention have been described, it will be understood that those skilled in the art may modify and change the present invention in various ways without departing from the spirit and scope of the present invention written in the claims.

What is claimed is:

1. A video decoding method, comprising:
receiving a video bitstream, the video bitstream comprising a block;
determining information about the block, the block having a width and a height;
determining whether the block uses an intra prediction mode, whether a size of the block satisfies a specific condition, and whether the block is related to a luma sample; and
determining an inverse transform method of the block to be inverse Discrete Sine Transform (inverse DST), when the block uses the intra prediction mode, the size of the block satisfies the specific condition, and the block is related to the luma sample,
wherein the size of the block satisfies the specific condition when a value obtained by multiplying the width and height of the block is 16.

2. The video decoding method of claim 1, further comprising determining the inverse transform method of the block to be inverse Discrete Cosine Transform (inverse DCT), when the block is not the block using the intra prediction mode, the size of the block does not satisfy the specific condition, or the block is not the block for the luma sample.

3. The video decoding method of claim 1, further comprising determining the inverse transform method of the block to be inverse Discrete Sine Transform (inverse DST), when the prediction block is the block using the intra prediction mode, the size of the block is 4×4 , and the block is the block for the luma sample.

4. The video decoding method of claim 3, wherein the block is computed based on a DC mode is performed filtering using values of a reference pixel and a prediction pixel, when the intra prediction mode is a DC mode.

5. A video decoding apparatus, comprising:
a receiving circuitry configured to receive a video bitstream, the video bitstream
comprising a block;
a block information receiving circuitry configured to receive information about the block, the block having a width and a height; and
an inverse transform method determination circuitry configured to determine whether the block uses an intra prediction mode, whether a size of the block satisfies a specific condition, and whether the block is related to a luma sample based on the information about the block,
wherein:
the determination circuitry is configured to determine an inverse transform method of the block to be inverse Discrete Sine Transform (inverse DST), when the block uses the intra prediction mode, the size of the block satisfies the specific condition, and the block is related to the luma sample, and the size of the block satisfies the specific condition when a value obtained by multiplying the width and height of the block is 16.

6. The video decoding apparatus of claim 5, wherein the inverse transform method determination module is configured to determine the inverse transform method of the block to inverse Discrete Cosine Transform (inverse DCT), when the block is the block using the intra prediction mode, the size of the block does not satisfy the specific condition, or the block is not the block for the luma sample.

7. The video decoding apparatus of claim 5, wherein the inverse transform method determination module is configured to determine the inverse transform method of the block to inverse Discrete Sine Transform (inverse DST), when the prediction block is the block using the intra prediction mode, the size of the block is 4×4, and the block is the block for the luma sample.

8. The video decoding apparatus of claim 7, wherein the block is computed based on a DC mode is filtered using values of a reference pixel and a prediction pixel, when the intra prediction mode is a DC mode.

9. A video decoding method, comprising:
receiving information about a block;
determining whether the block uses an intra prediction mode and information about the intra prediction mode used by the block;
determining a horizontal inverse transform method of the block to be inverse Discrete Cosine Transform (inverse DCT) when a number of the intra prediction mode is within a first range, the first range being 22 or more but 30 or less; and
determining the horizontal inverse transform method of the block to be inverse Discrete Sine Transform (inverse DST) when the number of the intra prediction mode is outside of the first range.

10. The video decoding method of claim 9, further comprising determining a vertical inverse transform method of the block to be inverse Discrete Cosine Transform (inverse DCT) when the number of the intra prediction mode is within a second range, the second range being 6 or more but 14 or less.

11. The video decoding method of claim 9, further comprising determining the vertical inverse transform method of the block to be inverse Discrete Sine Transform (inverse DST) when the number of the intra prediction mode is outside of a second range, the second range being 6 or more but 14 or less.

* * * * *